June 27, 1939.  R. H. DRAEGER  2,163,593
READING MACHINE
Filed April 6, 1937  4 Sheets-Sheet 1
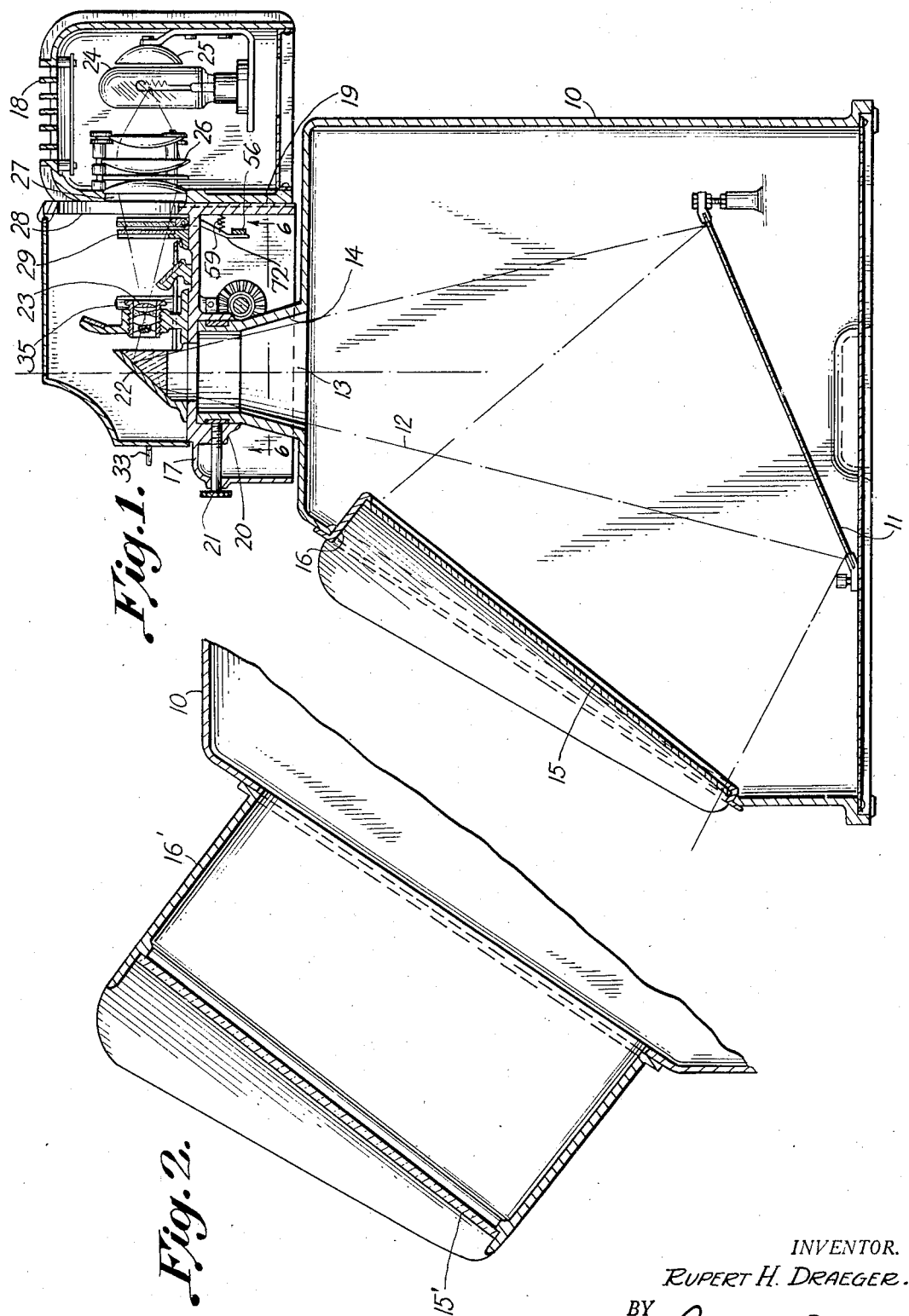
INVENTOR.
RUPERT H. DRAEGER.
BY
ATTORNEY.

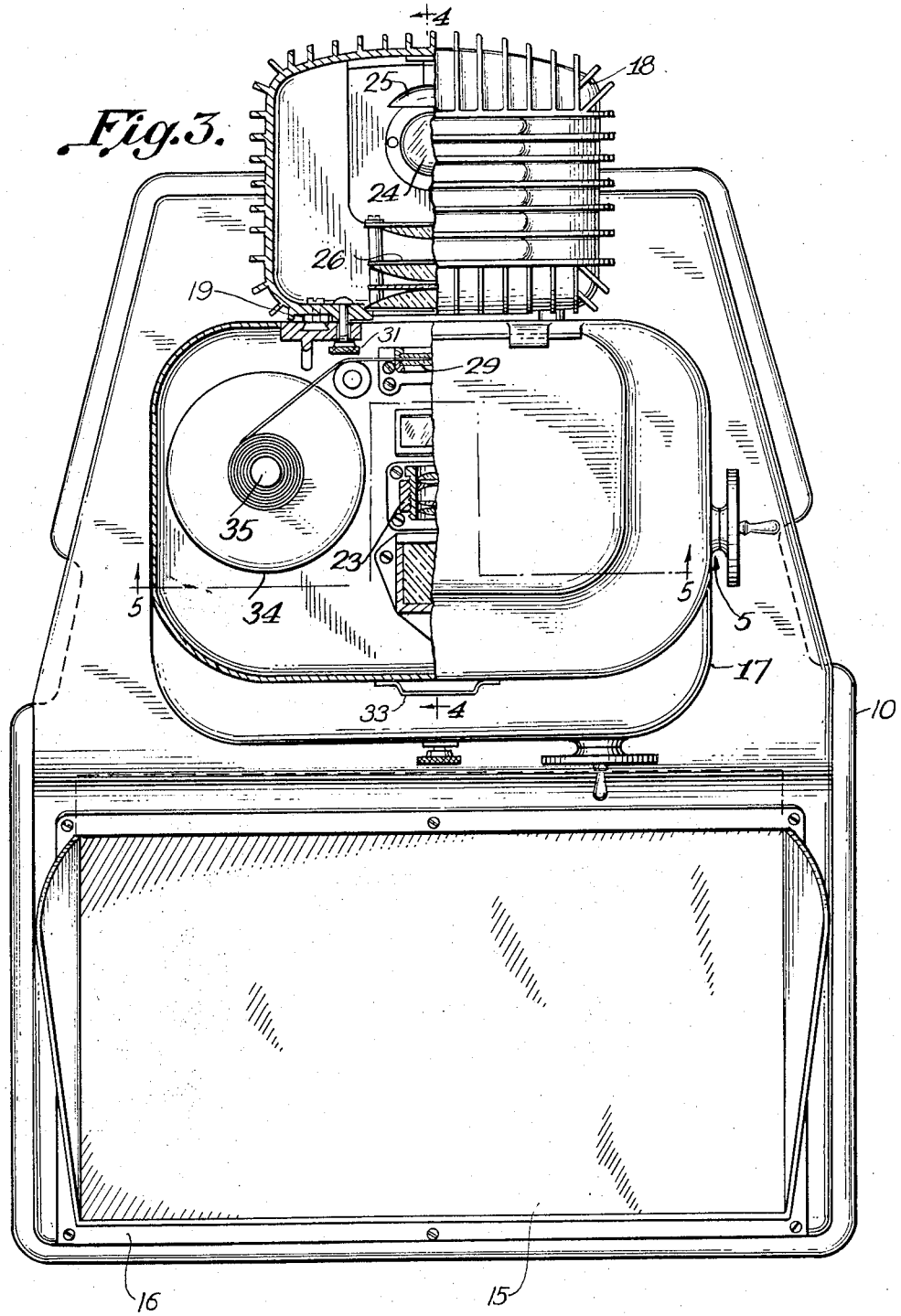

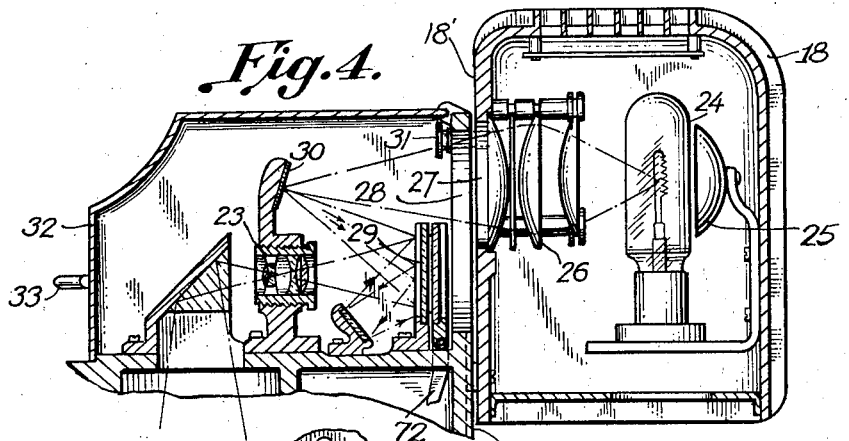
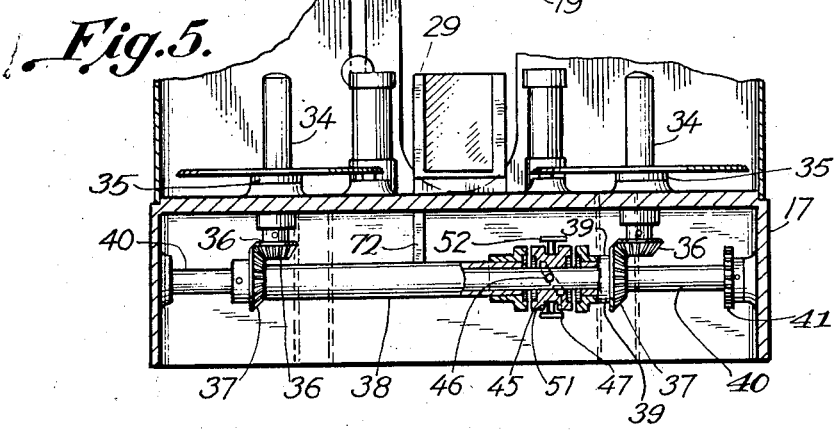
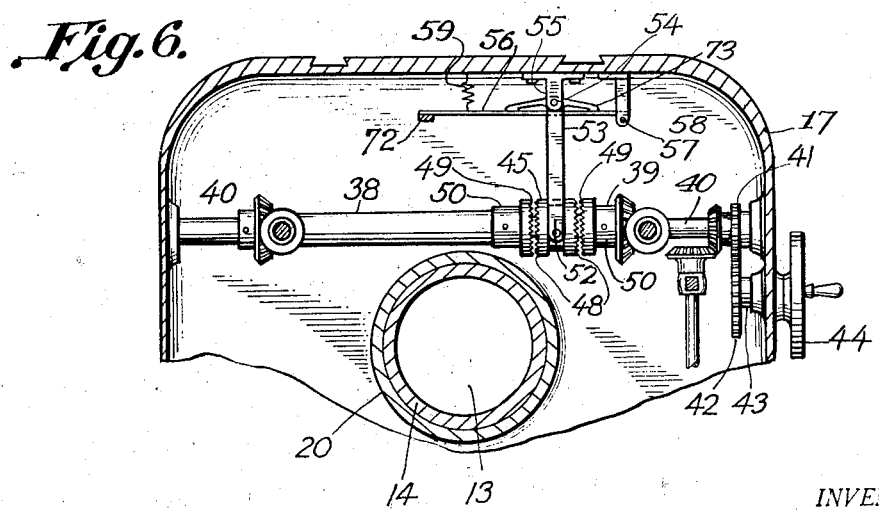

June 27, 1939.   R. H. DRAEGER   2,163,593
READING MACHINE
Filed April 6, 1937   4 Sheets-Sheet 4

INVENTOR
RUPERT H. DRAEGER.
BY
Robert A. Lavender
ATTORNEY

Patented June 27, 1939

2,163,593

UNITED STATES PATENT OFFICE 2,163,593

READING MACHINE

Rupert H. Draeger, United States Navy

Application April 6, 1937, Serial No. 135,265

6 Claims. (Cl. 88—24)

(Granted under the act of March 3, 1883, as amended April 30, 1928; 370 O. G. 757)

This invention relates to reading machines and more particularly to reading machines of the type adapted to the use of either photographic strip film or opaque tape having reading matter recorded thereon. The great part of opaque tape carrying reading matter or copy is made photographically from strip film. However, in so far as the device of this invention is concerned it is immaterial whether the opaque copy is produced photographically by contact printing, is photographically reduced directly onto sensitized paper, or is mechanically printed thereon by any of the well known processes.

The first object of this invention is to combine in one machine means for projecting an enlarged image of either transparent or opaque copy onto a screen from which it may be read.

Another object is to simplify the tape moving mechanism disclosed in my copending application Serial No. 49,757 filed November 14, 1935 on a Reading machine.

A further object of primary importance is to provide a neat and compact, light weight, sturdy, precision instrument at a moderate cost. Convenience of operation and perfectness of image which tends to obviate eye strain or fatigue, have likewise been made rigid requirements.

Included in this invention, as in that of the above mentioned copending application on a reading machine, is the object of providing a machine which may be set upon a desk or table and which is of such design, that the pages of a book or strip material may be made to appear before the reader, clearly in daylight or in a lighted room, be made to turn forward or backward with a minimum of effort, and also be made to appear right side up on the screen regardless of their position or positions on the tape. Likewise the provision of means for handling the tape with such ease and freedom from physical harm as to leave it in practically new condition after many insertions in the machine, has been carried over from the parent invention. The optical system of this reading machine is very similar to that shown in my previous reading machine, but the special features, which enable this device to be used for either transparent or opaque copy, comprise a modification of the prior optical system, an addition thereto and an adjustable lamp house carrying the source of light and the condenser lenses. In this new reading machine the objective lens is placed on the incident side of the reflecting prism. Directly above this lens a small tilted mirror has been placed. Since the beam of light emerging from the condenser system is approximately at a focus in the objective lens, an upward shift of this converging beam to a location, where the focal point is on the tilted mirror, causes the beam to be reflected in a diverging cone having substantially the same cross-sectional area as the incident beam at any vertical section through both beams. The tilt of the mirror is such that the reflected beam will cover the film gate through which the beam passed before the lamp house was moved upwardly. This will illuminate the front surface of any opaque copy placed in the film gate, without the use of an additional source of light.

A further object of this invention is the provision of interchangeable screens in frames adapted to space them at various distances from the objective lens and thus permit an image to be projected at various magnifications.

With the foregoing and other objects in view as will hereinafter become apparent, this invention comprises the construction, combination and arrangement of parts hereinafter claimed, disclosed and illustrated in the accompanying drawings wherein:

Fig. 1 is a vertical central section of the reading machine of this invention;

Fig. 2 is a similar sectional view of a modified form of the viewing screen and its mount;

Fig. 3 is a plan view partly broken away of the reading machine shown in Fig. 1;

Fig. 4 is a sectional view taken on line 4—4 of Fig. 3, the lamp house having been moved to the position for projecting reading matter recorded on opaque tape;

Fig. 5 is a sectional view taken on line 5—5 of Fig. 3 showing the spool control mechanism;

Fig. 6 is a section taken on line 6—6 of Fig. 1;

Figure 7:
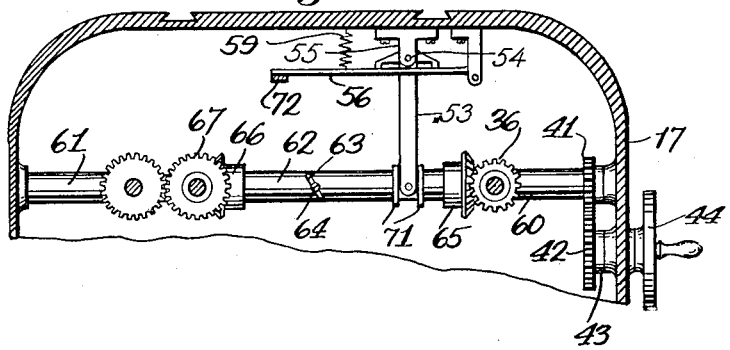
Fig. 7 is a sectional view similar to Fig. 6 showing a modified form of the spool operating mechanism being taken on line 7—7 of Fig. 8.

A light-tight housing or projection chamber 10 contains a reflecting mirror 11 mounted at a suitable angle to reflect light rays 12 received through the throat 13 of a neck 14 onto a viewing screen 15 mounted at a suitable angle in a screen holder 16 extending into the front of the chamber 10.

In Fig. 2 a modified screen holder 16' is shown as extending forwardly from the front of the projection chamber 10 for holding a screen 15' at a greater distance from the reflecting mirror 11.

Rotatably mounted on the neck 14 is the film or paper strip carrying head 17, to which the lamp chamber 18 is adjustably attached on the ways 19. The head 17 is supported on the neck 14 by means of the downwardly extending collar 20 having a set screw 21 extending therethrough for holding the head 17 at any desired angle of rotation on the neck 14. A reflecting prism 22 is mounted within the head 17 in line with the axis 13 of the neck 14 and reflects the light rays received from an objective lens 23.

The lamp chamber 18 contains lamp 24 and a reflector 25, which projects light rays from said lamp through a condenser lens system 26 and an opening 27 in the wall of the lamp chamber 18, then through a vertically elongated opening 28 in the wall of the head 17, and in Fig. 1 through the film gate 29 to the objective lens 23, whereby the light rays will pass through any transparent film that may be placed within the transparent film gate 29 when the device is used in the position shown in Fig. 1.

If an opaque copy, such as a paper strip, is used in the film gate 29, then the lamp chamber 18 is positioned on the ways 19 as shown at 18' in Fig. 4. The light rays passing through the lens system 26 from the lamp 24 then pass through the upper portion of the opening 28 in the wall of the head 17. They then strike a reflecting mirror 30 held at a certain angle above the objective lens 23 and are directed onto the front of the film gate 29, i. e. the side nearest the lens system 23 and thereby illuminate any image on the opaque film or strip which may be located within the film gate 29. Thus, by adjusting the position of the lamp chamber from that shown in Fig. 1 at 18 to that shown in Fig. 4 at 18' this reading machine may be used for projecting images printed on an opaque or on a transparent carrier.

The lamp chamber 18 is held in its correct adjusted position on the ways 19 by means of thumb nuts and bolts 31, access to which may be had by removing the cover 32 on the head 17, a finger hold 33 being provided to facilitate the removal and replacement of said cover. When it is removed, a film or tape spool 34 may be placed on or removed from spindles 35 rotatably mounted within head 17. The transparent or opaque strip may thus be placed in position for operation in the film gate 29 or may be removed therefrom. The rotation of the spindles 35 and the spools 34 is controlled by means of bevel gears 36 secured to spindles 35 and enmeshed with bevel gears 37 secured on sleeves 38 and 39 on a control shaft 40 which has its ends rotatably mounted in opposite side walls of head 17. This shaft is provided with a pinion 41 enmeshed with a gear 42 fixed on a shaft 43 extending through the side of the head 17 and carrying the hand wheel 44.

A double action clutch 45 is provided on the control shaft 40 between sleeves 38 and 39 and consists partially of a sleeve 45', and a pin 46 secured in shaft 40 and extending into a spiral groove 47 in the sleeve 45'. The ends of the sleeve 45' are formed into gear teeth 48 adapted to mesh with corresponding gear teeth 49 provided on collars 50 pinned to sleeves 38 and 39.

A neck 51 formed in the middle of sleeve 45 cooperates with a fork 52 at the end of an arm 53 which is pivoted at 54 on a bracket 55 supported on the inside of the head 17. A second arm 56 is pivotally supported at 57 on a bracket 58 in the head 17, and a spring 59 is fastened with one of its ends to the wall of said head and with its other end to the free end of the second arm, 56. The first arm 53 has two branches 73 extending laterally and forwardly therefrom. The spring 59 pulls the second arm, 56 toward the wall of the head to which the spring is fastened, and thereby the arm 56 is forced into contact with both branches 73 of the first arm 53. This arm is thereby pivoted into the position shown in Fig. 6, sliding the clutch sleeve 45' into neutral position on the shaft 40, i. e. into a position between the two collars 50, in which the end teeth 48 of the clutch sleeve 45' are out of engagement with either of the sets 49 of teeth on the collars 50.

When shaft 40 in Fig. 6 is rotated in either direction the combination of pin 46 and spiral groove 47 will move the clutch sleeve 45' toward one side or the other, whereby the teeth on one end of the clutch sleeve 47' will engage the teeth on the collar 50 on that side, so that the rotary movement of the shaft will be transferred to the corresponding sleeve 38 or 39, the bevel gear 37 on that sleeve, the bevel gear 36 meshing therewith and the corresponding spool 34.

When the clutch is moved into teeth engaging position, the first arm 53 is pivoted toward the same side to which the clutch sleeve 45' is moved, and one of the branches 73 will pivot the second arm 56 away from the wall of the head 17 against the pull of spring 59, for a purpose to be described hereinafter. Upon cessation of rotation of the control shaft 40 the spring 59 will act upon the second arm 56, as described above, positioning the clutch into neutral position. Upon reversal of direction of rotation of the control shaft the clutch will be moved toward the opposite side engaging the other collar and rotating the other spool, thereby moving the film in the opposite direction. The first arm 53 will be pivoted so that the other branch 73 will force the second arm 56, away from the wall of the head.

Figure 8:
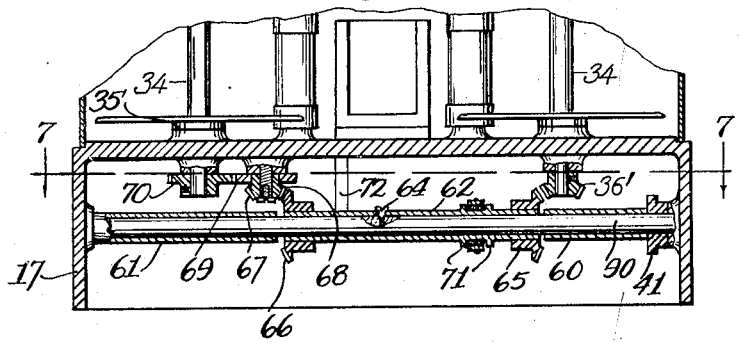
Fig. 8 is a sectional view, similar to Fig. 5, of the modified spool operating mechanism shown in Fig. 7.

In Figs. 7 and 8 a modification of the control mechanism described above is shown. The hand wheel 44 drives the spur gear 42, which is in mesh with the pinion 41 on the control shaft 40 journaled in the walls of the head 17. Adjacent the spur gear 41 a spacer tube 60 is located on the shaft 40 and on the opposite end of said shaft another spacer tube 61 is provided and intermediate these two tubes a clutch sleeve 62 is slideably arranged on the shaft. A spiral slot 63 is provided in said clutch sleeve and a shoulder screw 64 extends through the slot and is screwed into the control shaft 40. On each end of the clutch sleeve 62 one of bevel gears 65 and 66 are rigidly mounted. A bevel gear 36' is mounted on the lower end of the spindle of one of the spools 34 and is adapted to mesh with the bevel gear 65, when the clutch is moved toward the right in Fig. 8 in accordance with the direction of rotation of the control shaft 40.

A bevel gear 67 is rotatably mounted on a stub shaft 68 in a wall of the head 17, and a spur gear 69 is mounted on the hub of the bevel gear 67 for rotation with this bevel gear. On the lower end of the spindle 35' of the second spool 34 a spur gear 70 is rigidly mounted and is in mesh with the spur gear 69. The bevel gear 66 is adapted to mesh with the bevel gear 67, when the rotation of the control shaft is in a direction to move the clutch 62 toward the left in Fig. 8. In this manner the direction of travel of the film on the spools 34 may be controlled by rotating the control shaft in one direction or the other.

The clutch sleeve 62 is provided with a pair of collars 71 and the forked end of the lever 53 engages the clutch sleeve 62 between said collars. This lever is pivotally mounted and is constructed, and connected with the second arm 56, as described above, and tends, under pressure of spring 59, to hold the clutch 62 in the neutral position, as shown in Fig. 8.

In both modifications of the control mechanism the second arm 56, engages a lever 72 extending downwardly from the movable portion of the film gate 29. A spring 59 tends to keep this movable portion in gate closed position. As described above a movement in either direction of the first arm 53, caused by rotation of the control shaft, will also cause the second arm 56, to pivot away from the wall of the head to which it is fastened. Such movement of arm 56 will pivot lever 72 against the pull of spring 59 so that the film gate will be opened and will be kept open as long as the control shaft is being rotated, i. e. as long as the film is advanced in one direction or the other. When the rotation of the control shaft ceases and the film is stationary, the spring 59 will move the clutch into neutral position, so that all parts of the control mechanism will be in the position shown in Figs. 6 and 8 respectively, permitting the spring 59 to pivot the movable portion of the film gate into closed gate position. Whenever, therefore, the film stands still it is held securely in the gate, while, whenever it is advanced in either direction, the gate will be kept open permitting the film to travel freely therethrough.

The invention described herein may be manufactured and used by or for the Government of the United States of America for governmental purposes without the payment of any royalties thereon or therefor.

Having thus described my invention what I claim as new and desire to secure by Letters Patent is:

1. A reading machine comprising a projection chamber, a projection head on said chamber, the interior of the chamber communicating with the interior of the head through a hollow throat, said head having a hole in one of its walls, a film gate attached to the head and arranged in front of the lower portion of the hole, a reflecting prism attached to the head and located above the center of the hollow throat, an objective lens arranged between the film gate and the prism, a lamp house, a source of light within said house, a mirror attached to the head above the objective lens, the lamp house being adjustably fastened to the wall of the head having the hole therein, whereby rays from the source of light may be successively directed along a plurality of predetermined paths into the projection chamber as desired, one path leading through the film gate to the projection lens, thence to the prism and through the throat of and into said chamber; and a second path leading over the film gate to the mirror, thence to be reflected onto the side of the film gate toward the objective lens and through the throat of and into said chamber.

2. A reading machine comprising a projection chamber, a projection head on said chamber, the chamber and the head being connected with each other by a hollow throat, said head having a hole in one of its walls, a film gate attached to said head and arranged in front of said hole and comprising a movable portion, a reflecting prism attached to said head and mounted above said throat, a projection lens attached to said head and arranged between the film gate and the prism, a tilted mirror above said projector lens, a lamp house, a source of light within said house, the house being adjustably fastened to the wall of the head having the hole therein so that the rays from the source of light may be directed through the film gate, or over the film gate to the tilted mirror to be reflected onto the side of the film gate away from the lamp house, a pair of film spool receiving spindles rotatably mounted on the head and means for selectively rotating one of said film spools.

3. A reading machine comprising a source of light, a film gate, means for selectively directing the rays from the source of light to pass along one of two paths, namely, through the film gate, and to the side of the film gate away from the source of light, said film gate having a movable portion for opening said gate, a lever attached to said movable portion, a pair of rotatably mounted film spool spindles, one being at each side of the film gate, means for selectively rotating one of said spools, means actuated by said last named means for engaging the lever on the movable portion of the film gate for keeping said gate open while one of said spools is being rotated and for allowing said gate to be closed, when the spools are stationary, and means for normally keeping said gate closed.

4. A reading machine comprising a projection head, a control shaft rotatably mounted in said head, a pair of spools rotatably mounted on said head and adapted to support a roll of strip material, means for selectively connecting one of said spools with the control shaft for driving purposes and permitting the other spool to rotate freely, means for selecting said connection according to the direction of rotation of the control shaft, a film gate attached to said head comprising a movable part, means for normally urging this part to closed position, means for moving it into open position, said last named means being actuated by the selecting means upon rotation of the control shaft, a projection chamber, said chamber and said head being connected with each other by a hollow throat, a reflecting prism attached to said head above said throat, an objective lens attached to said head and arranged between the film gate and the prism, a tilted mirror above the objective lens, a lamp house slidably mounted on the head, said head having a hole in the portion abutting the lamp house and the film gate being located in front of the lower portion of said hole, a source of light in said lamp house the light from which may be selectively directed along one of two paths, namely, through the film gate and the objective lens to the prism, and over the film gate to the tilted mirror onto the side of the film gate away from the lamp house and then through the objective lens to the prism.

5. A projection reading machine comprising a projection head having an elongated aperture formed in one side thereof, and having mounted therein a film holder, an objective lens system in alignment with the film holder, and a reflecting means displaced from the axis of the objective lens system, and so positioned that light rays incident thereon are reflected to the film gate; a viewing screen adapted to receive the emittent rays from the projection head; a lamp house having therein a source of light and a condenser lens system, said lamp house being mounted adjacent the apertured side of the projection head; means selectively to displace the lamp house relatively to the projection head to one position in which the axis of the condenser lens system, one portion of the said aperture and objective lens system are in substantial alignment, and to another position in which the condenser lens, another portion of said aperture and a reflecting means are in substantial alignment.

6. A projection reading machine comprising a projection head having an aperture formed in one side thereof and having mounted therein a film holder, an objective lens system in alignment with the film holder, and a reflecting means displaced from the axis of the objective lens system and which reflecting means is so positioned that light rays incident thereon are reflected to the film holder and thence to the objective lens; a viewing screen adapted to receive the emittent rays from the projection head; a lamp house having therein a source of light and a condenser lens system, such lamp house being slideably mounted on the projection head, means selectively to displace the lamp house relatively to the projection head to one position in which the axis of the said condenser lens system, aperture and the objective lens system are in substantial alignment and to another position in which the condenser lens system, said aperture and reflecting means are in substantial alignment, whereby the transparencies or opacities may be mounted in the film holder and projected.

RUPERT H. DRAEGER.